United States Patent
Young et al.

(10) Patent No.: US 6,926,227 B1
(45) Date of Patent: Aug. 9, 2005

(54) EXTENDED RANGE, LIGHT WEIGHT LASER TARGET DESIGNATOR

(75) Inventors: Donald S. Young, Windham, NH (US); Victor A. Misek, Hudson, NH (US)

(73) Assignee: Bae Systems Information and Electronics Systems Integration Inc., Nashua, NH (US)

( * ) Notice: Subject to any disclaimer, the term of this patent is extended or adjusted under 35 U.S.C. 154(b) by 0 days.

(21) Appl. No.: 05/792,958

(22) Filed: Apr. 27, 1977

(51) Int. Cl.[7] .............................. F41G 7/00; G01S 5/16; G01S 7/28
(52) U.S. Cl. ...................... 244/3.13; 244/3.1; 244/3.11; 89/1.11
(58) Field of Search ............................... 244/3.16, 3.13, 244/3.1–3.3; 343/7.7, 17.1; 342/27, 28, 52–59, 61–67, 73–81, 147–158, 175, 195; 89/1.11

(56) References Cited

U.S. PATENT DOCUMENTS

| | | | | |
|---|---|---|---|---|
| 3,991,417 A | * | 11/1976 | Levine | 343/7.7 |
| 4,072,944 A | * | 2/1978 | Bianco et al. | 343/7.7 |
| 4,089,001 A | * | 5/1978 | Donahue | 343/7.7 |
| 4,096,478 A | * | 6/1978 | Chavez | 343/7.7 |

* cited by examiner

Primary Examiner—Bernarr E. Gregory
Assistant Examiner—Thomas H. Webb
(74) Attorney, Agent, or Firm—Daniel J. Long

(57) ABSTRACT

Pulse integration is utilized on board an optically guided missile or other ordinance device used as a part of a target designation system for extending the lock-on range of the missile by approximately 18%, when a double pulse laser is utilized to illuminate and designate the target. Pulse integration is accomplished with a recirculating delay unit which superimposes the first pulse on the second pulse, such that while the pulses add coherently, noise does not add in phase. The pulse integration technique therefore enhances the signal-to-noise ratio when the missile is at the outer limits of its operating range. When the missile is sufficiently close to the target, doublet decoding is actuated to offer countermeasure resistance. At this point, pulse integration may proceed in lieu of doublet decoding or may be dispensed with in view of the increased signal-to-noise ratio due to the close range of the missile to the target.

17 Claims, 3 Drawing Sheets

EXTENDED RANGE, LIGHT WEIGHT LASER TARGET DESIGNATOR

FIELD OF THE INVENTION

This invention relates to target designators, and more particularly, to a method and apparatus for extending the range of a target designator.

BACKGROUND OF THE INVENTION

Target designators, usually employing lasers, have in the past made use of a so-called "doublet pulse", a pulse burst containing two pulses, in which the inter-pulse spacing is varied to provide a code which can be recognized by incoming missiles, guided shells or other ordinance devices. Doublet pulse laser target designators suffer from the disadvantage of requiring almost twice the laser energy per doublet pair,in order to provide range performance equal to a single pulse system.

In a recent development, a large portion of the extra energy requirement is compensated for by the superior efficiency provided by multi-cavity single-pump lasers or single-pump multi-laser systems in which sequentially activated Q-switches are provided in the laser-cavities. In these lasers a single pumping pulse provides the energy for the multiple pulse out-put. Typical efficiency increases measured in the laboratory and during field tests show that doublet pulses generated in this manner contain 50% more energy than those from a single cavity, multi-pump laser or lasers for a given amount of flash lamp energy.

While the multiple cavity, single-pump lasers provide a substantial increase in range, a still further substantial improvement can be obtained by utilizing doublet pulse integration. While the subject invention will be described in terms of two pulses, it will be appreciated that pulse integration of any number of regularly spaced pulses will result in substantial range increases in terms of the range at which a missile carrying a seeker or optical tracking device will lock onto a target illuminated by the multiple pulses.

The purpose of the pulse integration is to time superimpose a first pulse and a second pulse in a doublet pair, such that the signal components add in-phase, while the noise components add in random phase. In the two pulse case, this results in an increase in signal-to-noise ratio (SNR) of at 2 at least 3 db over direct doublet detection, which corresponds to an increase in the lock-on range of approximately 18%.

If pulse integration is utilized, the seeker of the missile will lock on to the target at ranges which exceed that which would ordinarily be achievable by detection of the doublet pulse. Thus, the seeker is able to lock on to relatively weak signals due to the pulse integration technique. In the subject system there are two modes of operation, namely, the short range or doublet decode mode and the long range or extended range mode. In the extended range mode doublet pulse decoding is not utilized, and therefore, there is a certain amount of countermeasure susceptibility at distances which are at the fringe of system performance.

However, in the extended range mode, countermeasure effectiveness is minimized, since even if countermeasuring is employed, the missile will, nonetheless, approach the target. As the missile or guided shell approaches the target, the intensity of the received radiation increases. When this intensity increases above a predetermined threshold, a doublet decoder within the missile's seeker is activated and signals resulting from detected radiation are only gated to the guidance system of the missile if doublet pulses having a known predetermined inter-pulse spacing have been received. Thus, in this embodiment, the seeker system is switched from its long range or extended range mode to its short range or doublet decode mode when the detected signals reach a predetermined threshold. At this point, the seeker is hardened against countermeasuring.

In summary, in the doublet decode mode, each incoming doublet pair is decoded and if the pair has the appropriate inter-pulse spacing the outputs from the pulse integrators are sampled and transmitted to the missile's guidance system. Any signals not having the requisite pulse coding are inhibited from reaching the guidance system of the missile.

The system described, while operating in a long range—short range mode, also has two additional modes of operation. The first mode of operation leaves the pulse integration system in operation all the time, whereas, the second mode of operation disconnects the integration system when the missile is operated in the short range or doublet decode mode. In either case, range extension is achieved by the pulse integration.

Superposition of the first and second pulses is accomplished, in one embodiment, by a recirculating delay line and summation network combination. In another embodiment, the delay line is replaced by a lighter and more versatile device, called a serial analog delay or SAD.

Assuming that the seeker utilizes the conventional quad cell detector, the output from each of these detectors is amplified and mixed in three channels such that if the quad cells are designated A, B, C, and D, then the outputs of the amplifiers are applied to processors which perform the following functions: (A+B)−(C+D); (A+B)−(B+C); and A+B+C+D. This provides three channels of information from the quad cell detector. The first two of these channels constitute the up-down channel and the right-left channels respectively which provide the directional signals for the missile's guidance system.

In one embodiment, the outputs of these processors are applied to respective recirculating delay units each of which have a feedback circuit to a summing network which adds the output of the recirculating delay unit to the incoming signal. The recirculating delay is exactly equal to the expected inter-pulse spacing such that the two;pulses coherently add in the summing network. The output of each recirculating delay unit is applied through a gate to either the up-down or right-left signal channels of the guidance system of the missile.

The third channel is utilized to detect when the missile is within a predetermined short range of the target. This is accomplished by applying the output of this channel to the same type of recirculating delay unit described for the first two channels. The output of this recirculating delay unit is applied to a high level trigger, which, in essence, activates a doublet decoder when the level of the radiation at the seeker reaches a predetermined level indicating that the missile is within a predetermined short range of the target.

In order to provide a signal to the doublet decoder, the third channel is coupled to the doublet decoder. The output of the doublet decoder is applied to a switching or gating system such that the switching or gating system generates a pulse which activates the gates in the first two channels in the presence of an appropriate pulse doublet to sample the quad cell output. When the system is in its short range or doublet decode mode, assuming that the appropriate signals are available at the quad cell, the doublet decoder decodes the fact that the pulses have the requisite interpulse spacing and applies a gating pulse to the gates of the first two channels. The delay throughout the doublet decoder/ switching system corresponds to the expected inter-pulse spacing. Thus, if pulses of the appropriate inter-pulse spacing impinge on the quad cell their integrated values will be sampled and transmitted to the guidance system of the missile or ordinance device. Countermeasure signals are rejected by this system and do not affect the guidance system of the missile or ordinance device.

Alternatively, the pulse integration system may be completely taken out of the loop once the doublet mode threshold has been reached. This may have some advantages in close range situations where the signal-to-noise ratio is sufficiently high. However, it will be appreciated that by utilization of the recirculating delay units in the first two channels, an even higher signal-to-noise ratio can be obtained in these channels, with a consequent reduction in the false alarm rate.

It will also be appreciated that the system described includes "preprocessing" the signals from the quad cell detector prior to recirculation. If a recirculating delay line channel is provided for each quad cell detector, the processing for guidance purposes may be accomplished after the pulse integration in a "postprocessing" step.

It is therefore an object of this invention to provide an improved target designating system utilizing pulse integration for extending the range of the system;

It is another object of this invention to provide a target desiganting system which operates in a long range and a short range mode, in which at least the long range mode includes utilization of pulse integration for range extension;

It is another object of this invention to provide a method and apparatus for increasing the signal-to-noise ratio in seekers utilized with multiple pulse target designating systems.

These and other objects of the invention will be better understood in connection with the appended drawings in which:

DETAILED DESCRIPTION

Figure 1:
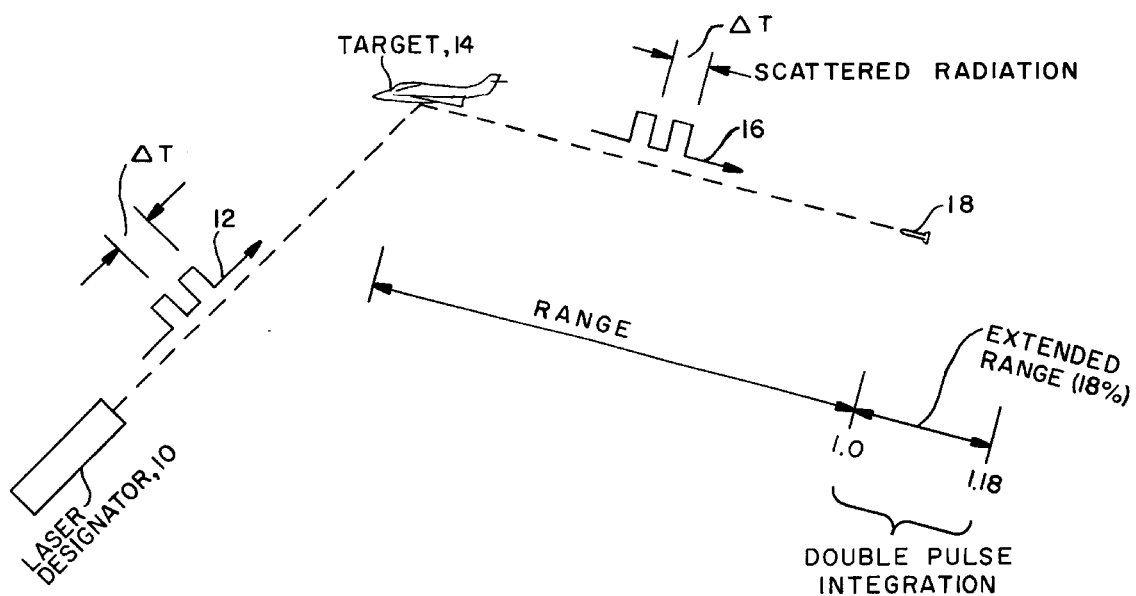
FIG. 1 is a diagrammatic representation of a doublet pulse laser target designating system indicating the extended range achievable by the utilization of doublet pulse integration.

Referring now to FIG. 1, a typical laser target designator system is depicted in which a source of multiple pulses, such as a laser 10, directs a pulse doublet 12 with an interpulse delay $\Delta T$ towards a target 14. The target scatters the light from the laser in all directions and scattered radiation in the form of a pulse doublet 16 propagates in the direction of a missile or guided ordinance device 18. Under ordinary circumstances, without pulse integration, the seeker aboard missile 18 would acquire the target at a normalized range 1.0 as illustrated. With the system to be described, target acquisition would take place at an extended range such as that illustrated, which in the doublet pulse case, is on the order of a 18% increase. In one embodiment, the normalized range defines a range perimeter with the target at its center. It is the function of the subject circuit to provide pulse integration circuitry at points outside the range perimeter, while activating doublet decoding when the missile is within the range perimeter. As will be seen, the range perimeter is set in terms of the intensity of the scattered pulsed radiation from the target. In the subject system the range perimeter is set by thresholding circuits within the seeker which will be described hereinafter. In general, the range perimeter defines the crossover point between extended range operation and doublet decode operation. This range is variable and depends on the signal-to-noise ratio of the signals as detected by the seeker at various ranges from a target. In one embodiment, the SNR at the crossover point is ~12. Obviously, the gain of the seeker utilized and the strength of the pulse source, along with the range of the pulse source to the target contribute to define the crossover threshold and thus the range perimeter. One system which provides the aforementioned extended range is now described in connection with FIG. 2.

Figure 2:
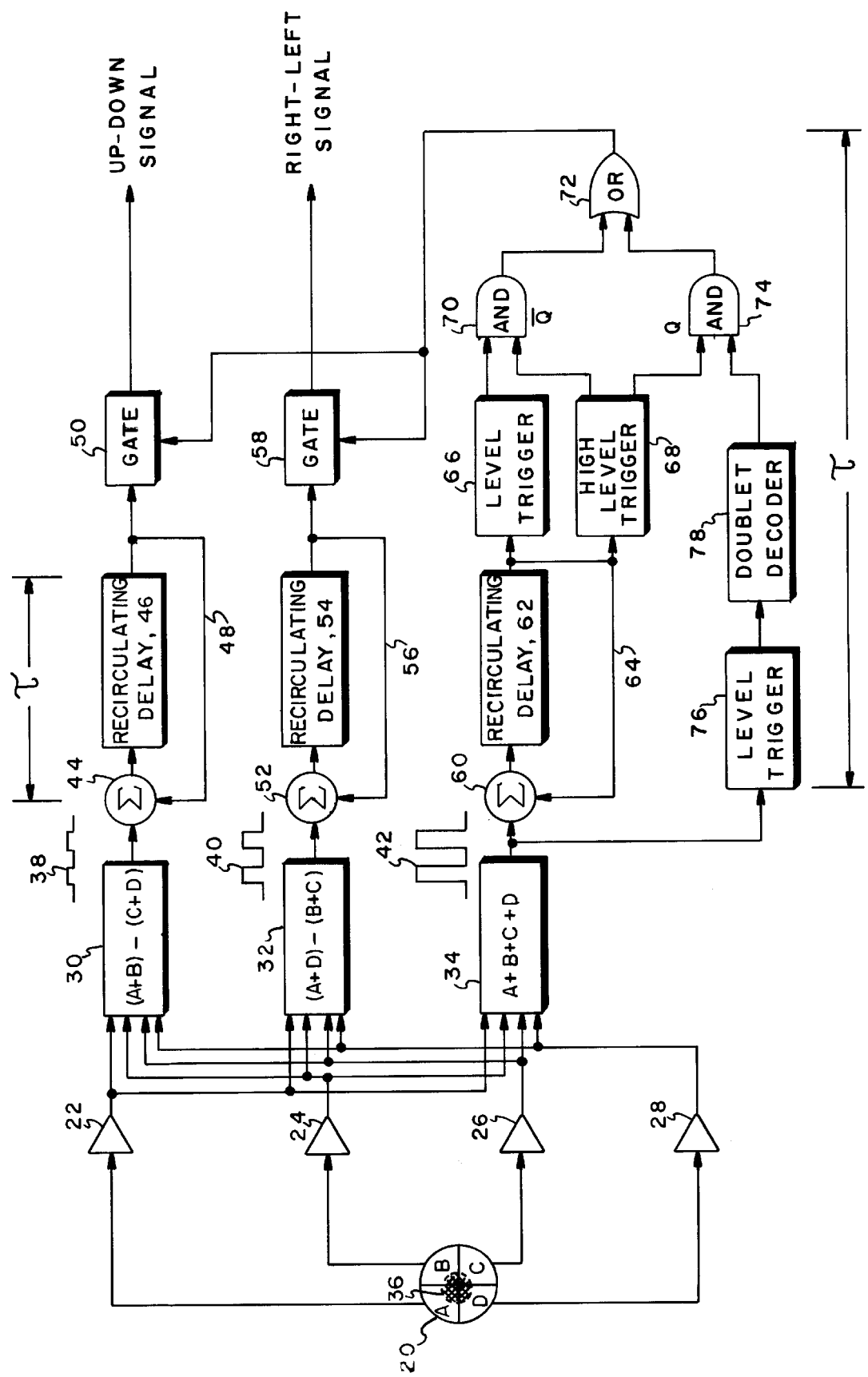
FIG. 2 is a schematic and block diagram of one type system for utilization in the seeker of the missile depicted in FIG. 1, in which a long range/short range mode is defined and in which multiple-pulse integration is utilized in the long range and short range modes.

Referring to FIG. 2, an ordinance device typically includes a "seeker" which is the name given an optical tracker. In general, optical trackers are provided with a quad cell type detection unit such as that illustrated at 20. The cell is divided into four segments A, B, C, and D, each carrying a detector, and these individual detectors are coupled to amplifying circuits 22, 24, 26, and 28 respectively. The output signals from the amplifying circuits are combined as illustrated in processors 30, 32, and 34, such that the output of processor 30 defines the up-down directional signal which is applied to the guidance control circuit (not shown) of the missile, and such that the output of processor 32 defines the right-left directional signal. The output of processor 34 defines the so-called "sum" channel which is used in some instances for normalizing the system, for controlling the sampling of the directional channels, and more specifically in the present case for providing a signal, the amplitude of which is used in changing the mode of operation of the seeker.

As illustrated, the returns from the target are imaged on the quad cell as illustrated at 36. As shown, the image at least partially overlaps all of the detectors in the quad cell. The resultant output signals from processors 30, 32, and 34 as a result of this image are illustrated at 38, 40, and 42 respectively.

Under normal circumstances, the outputs of processors would be applied directly to the guidance and control system for the missile or ordinance device. However, the effective range of such a system can be increased by as much as 18% in a doublet pulse case by pulse integration.

Pulse integration, as mentioned hereinbefore, involves the superposition of adjacent pulses which are then added in a coherent manner. Although this may be accomplished in a number of ways, one such system may include a summing network 44 and a recirculating delay unit 46 interposed in the first channel. The length of the de lay for the recirculating delay unit, Γ, is set equal to the expected interpulse spacing ΔT, such that the first pulse which is applied through the summing network to the recirculating delay unit, is delayed by Γ and then returned via line 48 to the summing network where it is coherently added with the second pulse. It will be appreciated that this is a coherent process for the signal only. Thus, noise, adding incoherently, is discriminated against. The result of the summation is then passed through the recirculating delay unit and applied to a gate 50 whose operation will be described hereinafter.

The second channel is likewise provided with a summing network 52 and a recirculating delay unit 54 with a feedback line 56 and is identical in operation to the first channel system. The output of recirculating delay unit 54 is applied to a second gate 58 whose function is the same as that of gate 50 and will likewise be described hereinafter.

The output of sum channel processor 34 is applied to a summing network 60 and thence to a recirculating delay unit 62 which has a feedback path 64 back to the summing network. The output of recirculating delay unit 62 is applied to a level trigger 66 and a high level trigger and latch circuit 68 which has Q and $\overline{Q}$ outputs. The output of level trigger 66 and the $\overline{Q}$ output of level trigger 68 are applied to a two input terminal AND gate 70 which has its output coupled to one input of a two input terminal OR gate 72. The Q output of level trigger 68 is applied to one input terminal of a two input terminal AND gate 74, which has its output coupled to the other input terminal of OR gate 72.

The output of sum channel processor 34 is also applied to an additional level trigger 76, the output of which is applied to a doublet decoder 78 which produces an output pulse upon the detecting of pulse doublets having the expected inter-pulse spacing. The output of the doublet decoder is applied to the other input terminal of AND gate 74.

In operation, a weak doublet signal arriving on boresight is enhanced in SNR by +3 db in the sum channel recirculating delay unit 62. The output from recirculating delay unit 62 triggers level trigger 66 but is not large enough to trigger the high level trigger 68 which is set to a level corresponding to the desired crossover point. The output of level trigger 66 passes through AND gate 70, OR gate 72 and gates the directional signals from recirculating delay units 46 and 54 to the guidance circuitry for the missile by virtue of actuating gates 50 and 58.

On boresight, while the directional signals are zero, the sum channel in essence tells the system that the zero outputs from units 46 and 54 are valid directional commands. Off boresight the directional signals will have the appropriate amplitudes and polarities to indicate the angular error away from boresight. In the weak signal, extended range mode, the outputs of high level trigger 68 are Q=0 and $\overline{Q}$=1. This disables level trigger 76 by inhibiting AND gate 74 while enabling level trigger 66 by enabling AND gate 70.

As the missile moves towards the target, the signal level increases until the high level trigger 68 is enabled. This sets the latch so that for the remainder of the mission Q =1 and $\overline{Q}$0. This disables level trigger 66 by inhibiting AND gate 70 and. enables level trigger 76 by enabling AND gate 74, allowing the system to go into the doublet decode mode.

In this mode, the system has a much higher countermeasure resistance because the doublet decoder will accept as valid signals only those pulse pairs which have the precise spacing required to satisfy the code. The gating signals now proceed from decoder 78 through AND gate 74 and OR gate 72 to activate gates 50 and 58. The delays in the recirculating delay lines and the doublet decoder are identical such that a doublet decoder pulse output coincides with a maximum SNR superimposed pulse pair from the recirculating delay units.

This means that upon decoding of the appropriate pair, gates 50 and 58 are opened at the right moment to allow the signals from delay units 46 and 54 to be applied to the follow-on guidance circuitry.

If high level jamming occurs when the system is in the low signal, extended range mode, the high level jamming signal would trigger the high level trigger 68, immediately placing the system into the doublet decode or short range mode. In this mode random jamming would be rejected and the seeker would continue on a neutral guidance error until the signal level increased to a level sufficient to trigger level trigger 76. Note, all of the level triggers are used to convert analog signals into digital signals for timing and switching purposes.

It is important to note that the overall delay through the summing networks and recirculating delay units in the first two channels, Γ, equal the overall delay through level trigger 76, doublet decoder 78, and the switching circuitry coupled thereto.

The advantages of the pulse integration described are as follows: The noise fluctuations in the vicinity of the two pulses in a doublet are usually independent because of the time separation. Noise, therefore, undergoes random phase addition in the summing network, causing the amplitude of the noise to increase by a factor of the square root of two. Therefore, the net change in signal-to-noise ratio is $2/\sqrt{2}$, or an improvement factor of the square root of two. Such an improvement in SNR translates to a $2^{1/4}$ improvement in doublet laser target designation range performance, yielding an increase of 18% in lock-on range for the same laser target designator power, the same probability of detection and the same false alarm rate.

Figure 3:
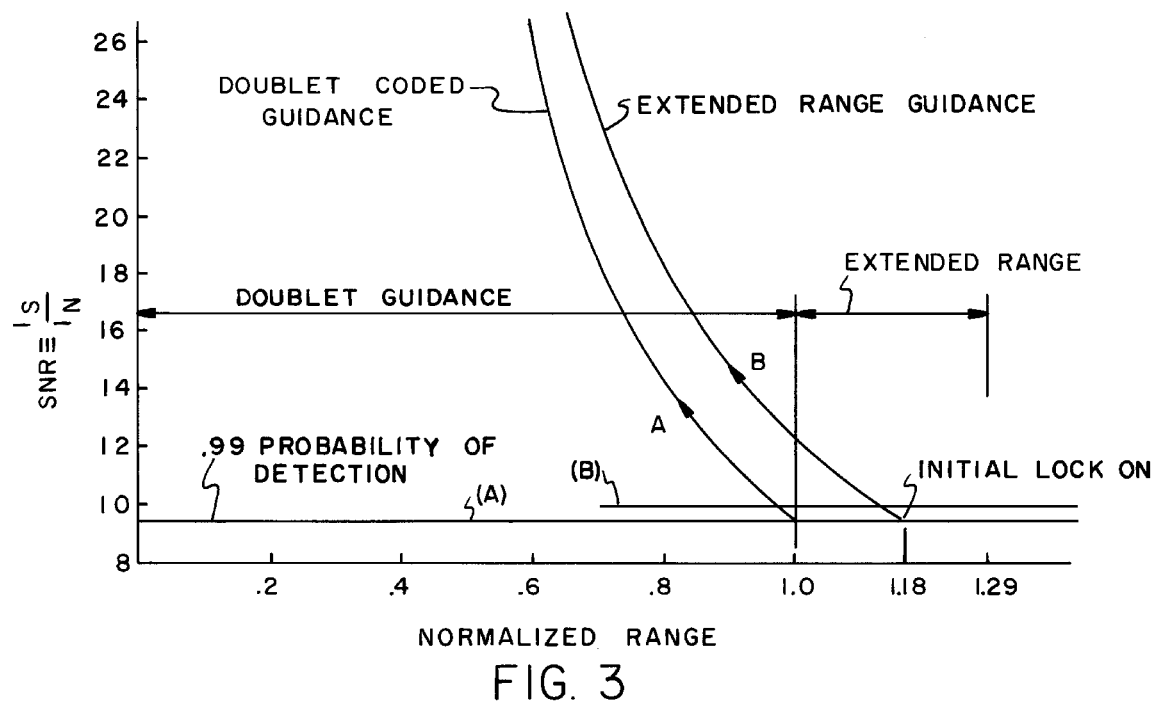
FIG. 3 is a graph showing the increased signal-to-noise ratio achieved within the pulse integration system as a function of normalized range, also indicating the extent of the range extension obtainable by doublet pulse integration.

A typical system operating senario has been platted in FIG. 3. Operation begins with initial system lock-on to the right of curve B. This is the extended range mode of operation.

The doublet decoder is not triggered because the signal does not have the benefit of the $\sqrt{2}$ SNR enhancement and is, therefore, below threshold at this range. In the extended range mode the doublet decoder output is always zero. Hence the $\overline{Q}$ output of trigger 68 is always at a logical one. The $\overline{Q}$ output enables AND gate 70 which then accepts pulses from level trigger 66, transfers them through OR gate 72 and enables gates 50 and 58. This permits the outputs from the recirculating delay units to be sampled only as they appear. Gates 50 and 58 are closed when signals are not present, thereby rejecting noise between valid signals.

In the extended range mode, the system provides only a modest amount of interference rejection. When the seeker reaches the normalized range, 1.0, the signal at the doublet decoder has increased inversely as the square of range by a factor of the $\sqrt{2}$, At this point, the doublet decoder begins to emit output pulses, assuming of course, that the correct code is received. The directional signals are now sampled only when valid signals are present. All incorrectly timed jamming is rejected automatically, and transfer to the doublet decoder is done automatically upon achieving sufficient signal strength.

As can be seen from the graphs of FIG. 3, there is significant advantage in the extended range guidance mode, since curve B defines a higher signal-to-noise ratio than curve A, which refers to operation without pulse integration.

Figure 4:
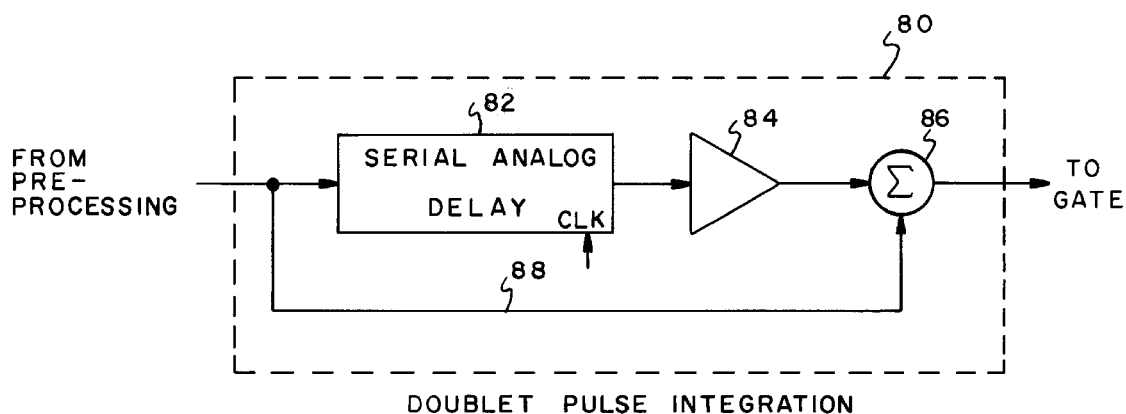
FIG. 4 is a schematic diagram of one type of pulse integrator usable in the system described in connection with FIG. 2.

Referring now to FIG. 4, doublet pulse integration can be alternatively accomplished by a unit diagrammatically shown as enclosed in dotted box 80. The input to this unit is the signal from the preprocessing circuits described above. In this embodiment, the signal from the processor is applied to serial analog delay 82 which is clocked at a rate which determines the delay. These devices are available as SAD Model No. SAD 100 from Reticon Corporation. The output of the serial analog delay is applied to an amplifying circuit 84 and thence to a summation network 86. The input signal to this unit is also applie over line 88 to the summing network such that the output of the serial analog delay is summed with the original signal. It will be appreciated that the first pulse of the doublet is delayed by the serial analog delay unit and reaches the summing network at the same time that the second pulse is directly delivered over line 88. The amplitudes of the summing network input signals are equalized to provide maximum signal-to-noise enhancement. Of course, the first pulse is also applied directly to the summing unit 86, but the gate to which this unit is attached is inactivated at this time and the first pulse is therefore inhibited.

Figure 5:
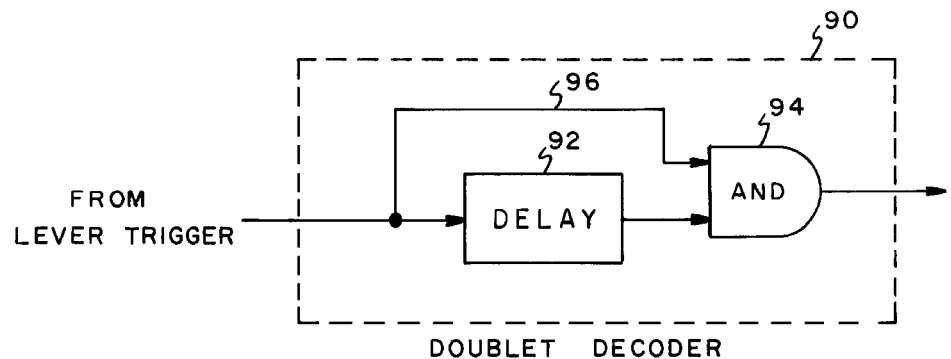
FIG. 5 is a schematic diagram illustrating a simplified doublet decoding system utilizable in the FIG. 2 embodiment; and, FIG. 6 is a schematic diagram illustrating a simplified system for one channel in which pulse integration is used only in the long range mode, with normal detection taking place in the short range doublet decode mode.

Referring now to FIG. 5, a simplified doublet decoder is illustrated within dotted box 90 to include a delay line 92 and a two terminal AND gate 94. The delay line is set such that its delay corresponds to the expected interpulse spacing. In this case, the first pulse is delayed and is applied to one input terminal of AND gate 94, whereas the second pulse is applied over line 96 directly to the other input terminal of AND gate 94. It will be appreciated that with the first pulse delayed, the first and second pulses will arrive at the input terminals to AND gate 94 simultaneously if the incoming doublet has the expected interpulse spacing. The output of AND gate 94 is a pulse which is generated simultaneously with the arrival of the output from the delay unit 92 and a signal on line 96. It will be appreciated that the input and output of the doublet decoder are digital signals.

Figure 6:
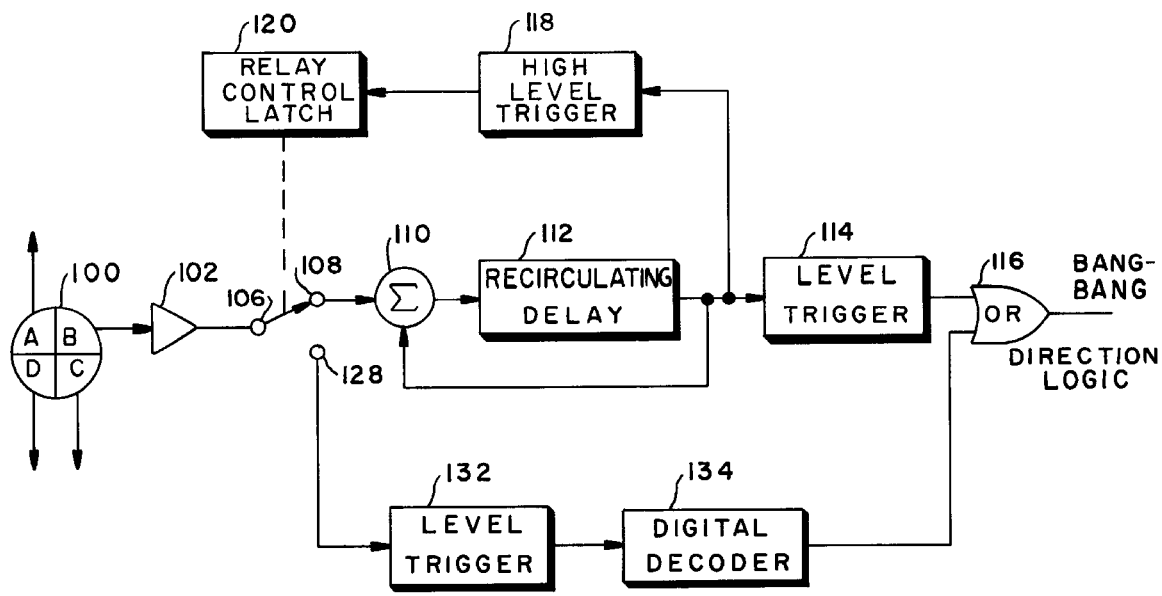

As mentioned hereinbefore, it is sometimes desirable to take the pulse integration circuits completely out of the loop when the seeker is operating in the doublet decode mode. One simplified circuit for doing this is illustrated in FIG. 6 in which only one channel of the system is illustrated. Typically, this system might use bang-bang directional logic as illustrated. In this system the B detector of a quad cell 100 is amplified at 102 and applied to a terminal 106 of a single-pole, double throw switch or relay generally indicated at 106. The switch has an output terminal 108 coupled to a summation network 110 which is, in turn, coupled to a recirculating delay unit 112. The output of unit 112 is coupled through level trigger 114 to one terminal of a two terminal OR gate 116, the output of which is coupled to one channel of the guidance system of a missile or ordinance device. The output of recirculating delay unit 112 is also coupled to a high level detector 118 which may be any kind of adaptive threshold device. This detector is, in turn, coupled to a relay or switch control unit 120 which controls the position of switch 106.

Output terminal 128 is coupled through a level trigger 132 to a doublet decode unit 134, with the level trigger and doublet decode units similar to that described hereinbefore. The output of the doublet decode unit is applied to one input terminal of a two input terminal OR gate 116, the output of which feeds the systems bang-bang guidance logic.

In operation, in the extended mode range, the switch 106 is in the position illustrated. In this position the output signals from the channel B detector are applied through the recirculating delay unit 112 to level trigger 114 which feeds the bang-bang guidance logic via OR gate 116.

When the level of the signal at the output of recirculating delay unit 112 reaches a predetermined level, high level trigger 118 is enabled and relay control latch unit 120 repositions switch 106 downwardly. Simultaneously, output terminal 128 is connected to the output of the channel B output and doublet decoding begins. The output of the doublet decoder feeds the bang-bang guidance logic via OR gate 116.

As will be seen in the doublet decode mode, the output of the channel B detector is fed directly through to the guidance system. Thus, in the doublet decode mode there is notpulse integration.

What is claimed is:

1. Apparatus for extending the range of a multi-pulse target designation system in which an ordinance device is provided with optical tracking apparatus and a guidance system coupled thereto, said tracking apparatus being adapted to detect the presence and position of pulses returned from an illuminated target, comprising:

means for coherently integrating the pulses detected by said tracking apparatus prior to the utilization of the integrated pulses for the guidance of said ordinance device, and, means for coupling the integrated pulses to said guidance system.

2. The apparatus of claim 1 wherein said means for coherently integrating the detected pulses includes means for delaying a first pulse by an amount corresponding to the interpulse spacing between the first pulse and a second pulse and means for recombining the delayed pulse with the second pulse.

3. The apparatus of claim 2 wherein said means for delaying includes a delay line and wherein said recombining means includes a summing network having at least one input coupled to the output of said delay line.

4. The apparatus of claim 2 wherein said means for delaying includes a serial analog delay unit.

5. The apparatus of claim 1 and further means for generating a gating signal responsive to the intensity of the pulsed radiation incident on said tracking apparatus exceeding a predetermined threshold, and to the incidence of pulses having a predetermined inter-pulse spacing at said tracking apparatus, and, means for gating the detected pulses to said guidance system responsive to the generation of said gating signal.

6. The apparatus of claim 5 wherein said gating means transmits to said guidance system pulses from said integrating means.

7. The apparatus of claim 5 wherein said gating means gates to said guidance system unintegrated detected pulses.

8. A method of extending the range of a multi-pulse target designation system in which an ordinance device is provided with optical tracking apparatus which detects the presence and position of pulses returned from an illuminated target comprising:

coherently integrating the pulses detected by the tracker prior to the utilization of the detected pulses for the guidance of said ordinance device.

9. The method of claim 8 wherein the step of coherently integrating the detected pulses includes the steps of delaying a first pulse by an amount corresponding to the inter-pulse spacing between the first pulse and a second pulse and recombining the delayed pulse with the second pulse.

10. The method of claim 8 and further including the steps of generating a gating signal responsive to the intensity of the pulsed radiation incident on the tracking apparatus exceeding a predetermined threshold, and responsive to the incidence of pulses having a predetermined inter-pulse spacing at said tracking apparatus, and, gating the detected pulses to the guidance system of said ordinance device responsive to the generation of the gating signal.

11. A method of extending the range of a multi-pulse target designation system in which an ordinance device is provided with optical tracking apparatus which detects the presence and position of pulses returned from an illuminated target comprising:

coherently integrating the pulses detected by the tracker when said ordinance device is outside a predetermined adaptive range perimeter centered on said target and, utilizing the integrated pulses in the guidance of said ordinance device.

12. The method of claim 11 wherein the step of coherently integrating the detected pulses includes the steps of delaying a first pulse by an amount corresponding to the inter-pulse spacing between the first pulse and a second pulse and recombining the delayed pulse with the second pulse.

13. The method of claim 11 and further including the steps of generating a gating signal responsive to the intensity of the pulsed radiation incident on the tracking apparatus exceeding a predetermined threshold which determined a predetermined adaptive range perimeter, and to the incidence of pulses having a predetermined inter-pulse spacing at said tracking apparatus, and, gating the detected pulses to the guidance system of said ordinance device responsive to the generation of the gating signal.

14. A method of extending the range of a multi-pulse target designation system in which an ordinance device is provided with optical tracking apparatus which detects the presence and position of pulses returned from an illuminated target comprising:

coherently integrating the pulses detected by the tracking apparatus when the pulsed radiation at ordinance device is below a predetermined value.

15. The method of claim 14 wherein the step of coherently integrating the detected pulses includes the steps of delaying a first pulse by an amount corresponding to the expected inter-pulse spacing between the first pulse and a second pulse and recombining the delayed pulse with the second pulse.

16. An extended range target designation system comprising:

laser target designating means which projects at least two pulses of electromagnetic radiation of known inter-pulse spacing towards a target, and, a guided ordinance device, said device having a guidance system and optical tracking apparatus coupled thereto for detecting the location of pulsed radiation scattered by said target towards said ordinance device, said optical tracking apparatus including means for coherently adding said pulses and for transmitting the resulting signal to said guidance system whereby the operating range of said tracking apparatus is extended.

17. The system of claim 16 wherein said optical tracking apparatus includes means for permitting only pulses having said known inter-pulse spacing to affect the guidance system of said ordinance device when said ordinance device is within a predetermined adaptive range perimeter centered on said target, said range perimeter being dependent on the intensity of the pulsed radiation scattered by said target.

* * * * *